United States Patent [19]
Bruhn et al.

[11] Patent Number: 5,764,244
[45] Date of Patent: Jun. 9, 1998

[54] ARRANGEMENT FOR POSITIONING A PEN IN A RECORDING DEVICE

[75] Inventors: Arno Bruhn, Wülfrath; Hans-Herbert Kirste, Landesbergen, both of Germany

[73] Assignee: Hartmann & Braun A.G., Frankfurt, Germany

[21] Appl. No.: 740,064

[22] Filed: Oct. 24, 1996

[51] Int. Cl.$^6$ .............................. G01D 9/00; B41J 29/38
[52] U.S. Cl. .................................. 346/31; 347/14
[58] Field of Search ................... 346/31; 347/104, 347/31, 32, 15, 16, 14; 358/298; 364/474.35; 318/628, 632

[56] References Cited

U.S. PATENT DOCUMENTS

| | | | |
|---|---|---|---|
| 4,893,066 | 1/1990 | Stewart et al. | 318/600 |
| 5,455,609 | 10/1995 | Gast et al. | 347/32 |
| 5,513,114 | 4/1996 | Matsumoto | 364/474.35 |
| 5,619,242 | 4/1997 | Haneda et al. | 358/298 |

FOREIGN PATENT DOCUMENTS

| | | | |
|---|---|---|---|
| 0078367 | 5/1983 | European Pat. Off. | G01D 15/24 |
| 0320316 | 6/1989 | European Pat. Off. | G01D 9/40 |
| 3607249 | 3/1986 | Germany | G01D 9/10 |

OTHER PUBLICATIONS

Manfred Stern, Hans–Peter Mansshardt, "Servoantriebe im Umbruch", pp. 58–66, *Elektronik*, 21/1994–German publication.

Author unknown, "Pulsmodulation", pp. 91–94, *Funkschau*, 1979, Heft 2–German publication.

*Primary Examiner*—N. Le
*Assistant Examiner*—Thinh Nguyen
*Attorney, Agent, or Firm*—Michael M. Rickin

[57] ABSTRACT

The present invention is embodied as an arrangement for positioning a pen in a device that records the time profile of a measurement signal which can be connected to the device. The arrangement provides high mapping accuracy of the measurement signal onto the recording signal at a low cost and with DC isolation between the measurement signal and drive means of the pen. The arrangement uses a control loop that has a pulse width modulator whose output is DC-decoupled to a signal converter that provides the drive signal for the motor that moves the pen.

17 Claims, 2 Drawing Sheets

ARRANGEMENT FOR POSITIONING A PEN IN A RECORDING DEVICE

FIELD OF THE INVENTION

This invention relates to an arrangement for positioning a pen in a recording device for recording the time profile of a measurement signal which can be connected to the recording device.

DESCRIPTION OF THE PRIOR ART

EP 0 078 367 discloses a recording/display apparatus for industrial processes having a movable apparatus whose position indicates the magnitude of a method or process condition to be monitored and which can be driven by a stepping motor which can be operated by sequential pulses from a clock pulse device and with a feedback device for developing a feedback signal corresponding to the position of the moveable apparatus within an overall measurement range of positions of this apparatus with an error device for producing an error signal which indicates the difference between the feedback signal and a measurement signal. In this case, a dead-band device which responds to the error signal is provided for developing a control or regulation signal. The dead-band device responds when the error signal is located outside a predetermined dead-band around the position which is represented by the measurement signal.

Furthermore, a circuit device is provided which responds to the initial development of the control or regulation signal in order to activate the stepping motor for the purpose of producing a limited correction effect of a predetermined extent in order to move the apparatus back into the position which is represented by the measurement signal. Also a second circuit device is provided which responds to the control and regulation signal in order to activate the stepping motor beyond the predetermined extent. The second circuit device responds when the error signal is still located outside the dead-band at the end of a predetermined time interval after the activation of the stepping motor by the first device.

This known apparatus has the disadvantage that the bandwidth of the measurement signal, which is predetermined by the dead-band device makes itself evident as a recording error between the actual measurement signal and the recorded signal. Changes to the measurement signal within the bandwidth of the dead-band device are not recorded. To this extent, the bandwidth of the dead-band device is a measure of the recording accuracy and of the quality class of the recording device.

Furthermore, it is known from experience that any reduction in the bandwidth of the dead-band device for the purpose of increasing the recording accuracy leads to instabilities in the positioning control loop. These instabilities make themselves evident in overshoots of the recording signal in comparison with the measurement signal.

Particularly when recording measurement signals which are generated in measurement signal sources which are physically located in an area where there is an explosion risk, DC isolation between measurement signal sources within the area where there is an explosion risk and recording devices and other signal processing means outside the areas where there is an explosion risk is specified as essential.

DE 36 07 249 describes a pen printer which, in principle, is suitable for recording measurement signals from areas where there is an explosion risk. The pen printer is equipped with at least one first unit which is composed of a moving pen carriage which can be moved in a direction at right angles to the movement direction of a curved sheet as a function of the magnitude of a measurement signal, of a servo unit which has a potentiometer for producing a position feedback signal which is assigned to the position of the pen carriage and which servo unit is designed integrally with a servo amplifier which produces the difference between the measurement signal and the position feedback signal from the potentiometer, and which drives a servo motor in a predetermined direction such that the difference tends to zero, the pen carriage being moveable appropriately and a guidance shaft which is arranged between both sides of one end of a printed circuit board and on which the pen carriage is mounted such that it can be removed, the pen carriage being provided with a pen which can produce recordings on the curved sheet analogous to the magnitude of the measurement signal, the measurement signal being converted using an analogue/digital converter, called an A/D converter in the following text, into a digital signal which is then fed to the servo unit under the control of a microprocessor, via a digital/analogue converter, called a D/A converter in the following text. In this case, optocouplers are provided between the A/D converters and the microprocessor, via which the digital signal which represents the measurement signal is transmitted. The digital output signal of the microprocessor is converted back into an analogue signal via a D/A converter, a servo motor being controlled by the amplitude of the analogue signal which is being converted back.

The positioning of the printing systems in such a pen printer can admittedly be represented such that it follows the measurement signal very accurately, however, this is highly complex in a disadvantageous manner since one A/D converter and one D/A converter must be assigned to each individual measurement channel. The reproduction accuracy of the measurement signal to its mapping as a recorded signal is limited by the number of data bits in the digital output of the A/D converter and the digital input of the D/A converter. The outlay required for n recording channels, as the required recording accuracy increases, rises to 2n converter assemblies for analogue-digital-analogue conversion. Furthermore, either k optocouplers or in each case one parallel-series converter between each A/D converter and an optocoupler assigned to them are required in order to transmit a data word which has k bits and can be picked off at the output of an A/D converter.

Thus it is desirable to specify means for positioning a pen in a recording device, in the case of which means the measurement signal is DC isolated from the drive means of the pen and which means make it possible to map the measurement signal onto the recording signal as accurately as possible, with a low level of outlay.

A recording device for recording the time profile of at least one measurement signal. The recording device has a mechanism for transport of a medium to record the time profile and a printing system. The printing system has an electric drive motor; a transmission apparatus for conversion of the rotational drive movement of the drive motor into a translational movement transversely with respect to the transport direction of the recording medium; a pen holder which is arranged such that it follows the translational movement of the transmission apparatus. The drive motor is mechanically coupled through the transmission apparatus, such that it is electrically isolated, to the pen holder.

The recording device further has an element for determining the current position of the pen and providing an electrical pen position signal indicative thereof, and an element for controlling the drive motor. The drive motor controlling element includes the element for determining the current pen position.

The element for determining the current pen position has a control loop which has a summation device for determining a control error signal as the difference between the measurement signal and the electrical pen position signal, a pulse-width modulator responsive to the control error signal for generating a PWM signal, a signal converter for converting the PWM signal to a signal voltage for driving the drive motor, and a circuit connected between the pulse-width modulator and the signal converter for DC-decoupling the PWM signal to the signal converter.

DESCRIPTION OF THE PREFERRED EMBODIMENT(S)

Figure 1:
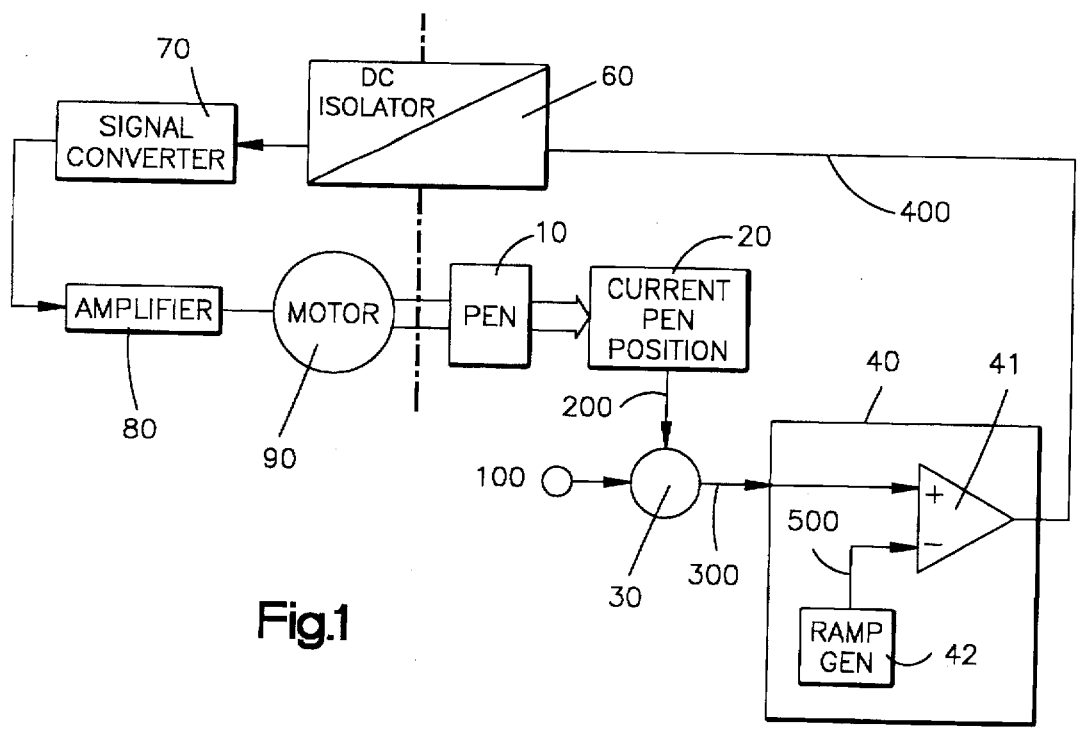
FIG. 1 shows an outline circuit diagram of a positioning control loop.

FIG. 1 shows an outline circuit diagram for a positioning control loop for positioning a pen 10 in a recording device for recording the time profile of at least one measurement signal 100 which can be connected to the device. The recording device itself has means, which are known per se, for transport of a recording medium, at least one printing system composed of an electric drive motor 90, a transmission apparatus for conversion of the rotational drive movement of the drive motor 90 into a translational movement of the pen 10 transversely with respect to the transport direction of the recording medium, and means for holding the pen 10, which means are arranged such that they follow the translational movement of the output drive of the transmission apparatus. Furthermore, the recording device is equipped with means 20 for determining the current pen position with an output of a pen position signal 200 which is adequate for the pen position, and means for controlling the drive motor 90 corresponding to the measurement signal 100 as a function of the current pen position signal 200.

In detail, on the basis of the means 20 for determining the current pen position, a summation device 30 has been provided to whose input the pen position signal 200 and the measurement signal 100 are applied and whose output emits a control error 300 as the difference between the measurement signal 100 and the pen position signal 200. The control error 300 is a measure of the instantaneous value of the error between the measurement signal 100 to be recorded and the measured value which is actually recorded on the basis of the current pen position and is quantified via the pen position signal 200.

Connected downstream of the summation device 30 is a pulse-width modulator 40 which may be composed of a ramp generator 42 and of a comparator circuit 41 having two inputs. The control error 300 is connected to the first input of the comparator circuit 41, and the output signal of the ramp generator 42 is connected to the second input of the comparator circuit 41. The output signal of the ramp generator 42 is called the ramp signal 500. The comparator circuit 41 has an output which is at the same time the output of the pulse-width modulator 40 and at which a pulse-width-modulated control signal 400 can be picked off.

Connected downstream from the pulse-width modulator 40 are means 60 for DC isolation of the pulse-width-modulated control signal 400, which is connected in DC terms to the measurement signal 100, to the pen position signal 200 and to the control error 300, from the means for controlling the drive motor 90.

Connected downstream from the means 60 for DC isolation is a signal converter 70 which is suitable for converting the pulse-width-modulated control signal into a signal voltage which is appropriate for the type of drive motor 90. The function blocks which are DC-isolated from one another are divided off in FIG. 1 by a dashed-dotted line. Connected downstream from the signal converter 70 is an amplifier 80 for matching the rating of the signal converter 70 to the drive motor 90. The drive motor 90 is mechanically coupled to the means for holding the pen 10, in an electrically isolated manner via a transmission apparatus which is not illustrated. The pen 10 is mechanically connected to the means 20 for determining the pen position.

The functional blocks of the positioning control loop, which are connected in a DC isolated manner to measurement signal sources physically located in an area where there is an explosion risk, and are composed of the means 20 for determining the pen position, of the summation device 30 and of the pulse-width modulator 40, manage in an advantageous manner without power components, so that the relevant legal regulations relating to the operation of electrical devices in areas where there is an explosion risk can technically be complied with.

A refinement of the invention provides that the means 60 for transmitting electrical signals such that they are DC-decoupled is an optocoupler. Such optocouplers are advantageously available as prefabricated standard components, so that complex production methods, as would have been required for comparable isolating transformers, are obviated. Furthermore, the frequency spectrum which can be transmitted by an optocoupler extends down to DC transmission. In consequence, the design of the ramp generator 42 is simplified in an advantageous manner, in that an oscillation frequency can be specified whose spectral radio-frequency components remain low, so that the radiated emitted interference, which influences electromagnetic compatibility, can be avoided.

It can furthermore be provided that the signal converter 70 is a microcontroller. Because they can be programmed without changing the circuit structure, such microcontrollers can be matched both to different types of drive motor 90 and to different operating modes of conversion of the received pulse-width-modulated control signal 400. This advantageously simplifies the starting up of the recording device.

In a further refinement of the invention, it can be provided for the ramp generator 42 to be designed as a sawtooth-waveform signal generator. Such sawtooth-waveform signal generators are advantageously distinguished by very simple construction.

In another embodiment, it can be provided for the ramp generator 42 to be designed as a triangular-waveform signal generator. The output signal of a triangular waveform generator advantageously has a frequency spectrum with monotonically falling amplitudes for rising frequencies. This characteristic is particularly advantageous when the electromagnetic compatibility requirements for the recording device are stringent.

Figure 2A:
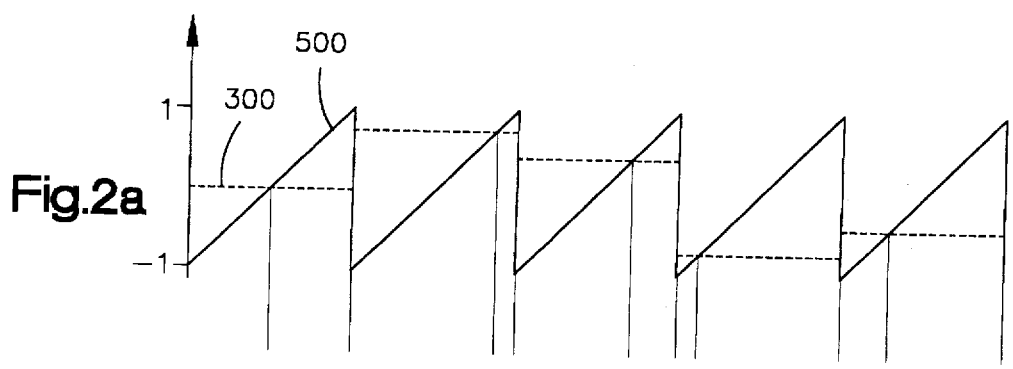
FIG. 2 shows time-profile diagrams for selected signal profiles.
Figure 2B:
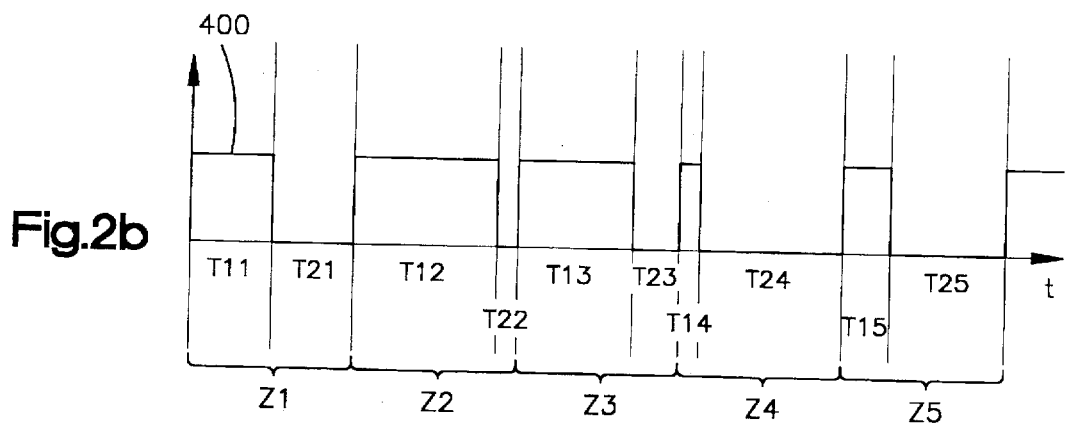

A pulse-width-modulated control signal 400, whose period according to FIG. 2 is composed of a pulse duration T11 to T15 and of a pulse-pause duration T21 to T25, can be picked off at the output of the pulse-width modulator 40. FIG. 2 shows time-profile diagrams for selected signal profiles. FIG. 2a shows a normalized ramp signal 500 as a sawtooth-waveform signal between the limits "−1" and "1". Furthermore, FIG. 2a shows various states Z1 to Z5 of the control error 300 in normalized form as a dashed line between the limits "−1" and "1". FIG. 2b shows the pulse-width-modulated control signal 400 during the states Z1 to Z5, corresponding to the control error 300.

The control error 300 during the state Z1 is equal to zero. The pulse duration T11 of the pulse-width-modulated control signal 400 and the pulse-pause duration T21 have the same time duration in the state Z1. The value of the control error 300 is zero, which means that the pen position is an exact representation of the instantaneous measurement signal 100. There is thus no need for correction of the pen position.

During state Z2, the control error 300 is highly positive as a result of a sudden change in the measurement signal 100 and, as a consequence of this, the pulse duration T12 is much longer than the pulse-pause duration T22 of the pulse-width-modulated control signal 400 in the state Z2. The large magnitude of the time difference between the pulse duration T12 and the pulse-pause duration T22 causes the pen 10 to move at high speed in a first movement direction transversely with respect to the transport direction of the recording medium.

As the follow-up movement of the pen progresses, the magnitude of the difference between the pen position signal 200 and the measurement signal 100 is reduced, so that the control error 300, as illustrated in the state Z3, approaches the value zero. In this case, the pulse duration T13 is still longer than the pulse-pause duration T23, but the magnitude of the difference between the pulse duration T13 and the pulse-pause duration T23 in the state Z3 is less than the difference between the pulse duration T12 and the pulse-pause duration T22 in the state Z2. As the magnitude of the difference between the pulse duration T13 and the pulse-pause duration T23 continues to reduce, the speed with which the pen 10 moves transversely with respect to the transport direction of the recording media is reduced, until the state Z1 is reached.

A sudden change in the control error 300 into the negative area is illustrated in the state Z4, which results in the pulse duration T14 being much shorter than the pulse-pause duration T24. The magnitude of the difference between the pulse duration T14 and the pulse-pause duration T24 is comparatively large and thus results in the pen 10 moving at high speed transversely with respect to the transport direction of the recording medium and, because of the negative mathematical sign of the difference between the pulse duration T14 and the pulse-pause duration T24, in a second movement direction opposite to the first.

As the pen position signal 200 becomes increasingly close to the instantaneous measurement signal 100, the control error 300 approaches the value zero so that, as illustrated in the state Z5, the pulse duration T15 grows and the pulse-pause duration T25 is shortened until the state Z1 is reached. The magnitude of the difference between the pulse duration T15 and the pulse-pause duration T25 is comparatively small, so that the pen 10 is moved with a lower speed of motion. Furthermore, the difference between the pulse duration T15 and the pulse-pause duration T25 is negative, so that the pen 10 is moved in the second movement direction.

Figure 3:
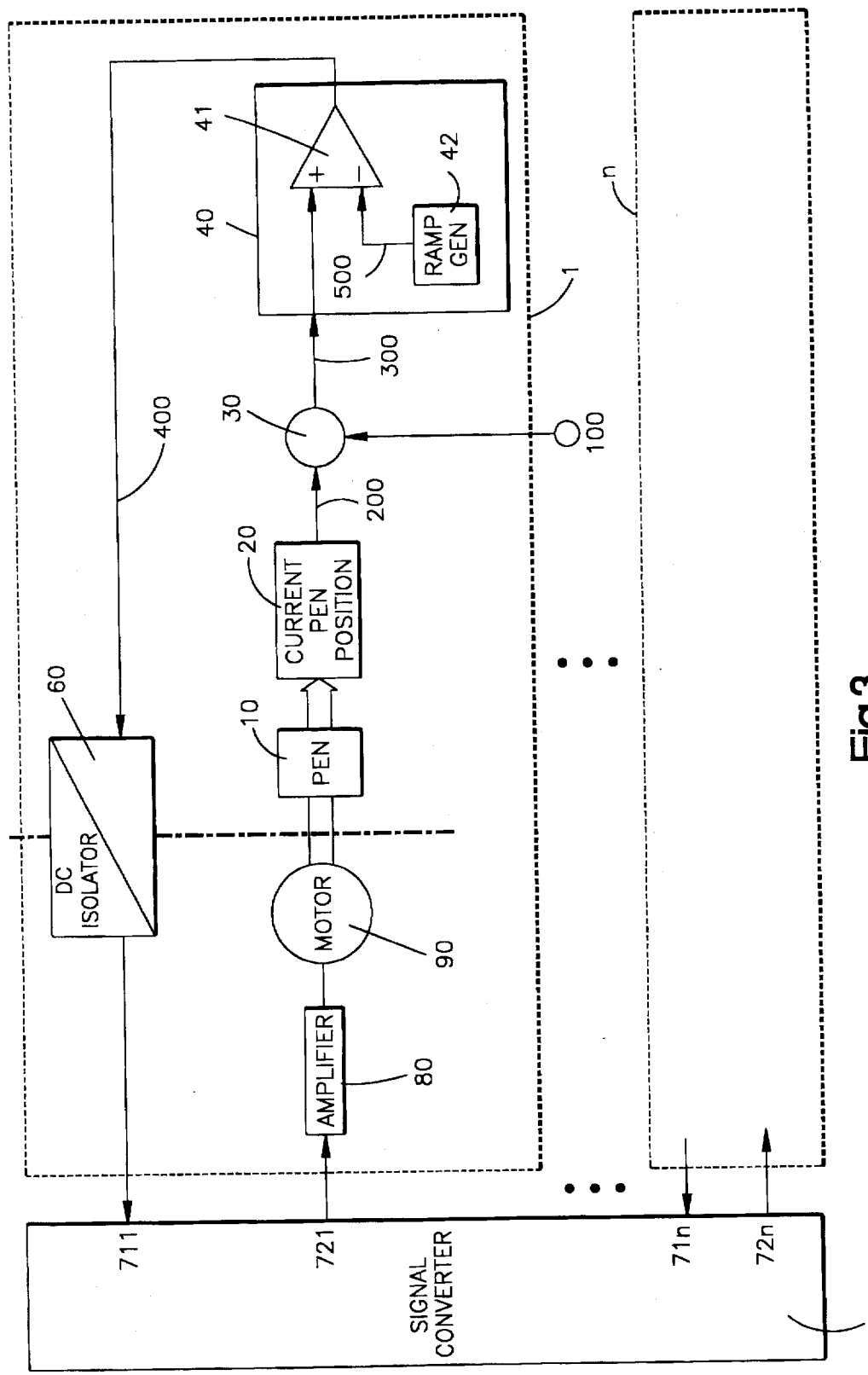
FIG. 3 shows an outline circuit diagram for position control in a multi-channel recording device.

In a further refinement of the invention it can be provided in a multi-channel recording device for the signal converter 70, which is designed as a microcontroller to be provided, according to FIG. 3, using the same reference numbers as in FIG. 1 for the same means as a common signal converter 70 for a plurality of recording channels 1 to n.

The super converter 70 has n, and only n inputs 711 to 71n and n outputs 721 to 72n for n recording channels 1 to n, which inputs and outputs are assigned in pairs to in each case one of the recording channels 1 to n.

The particular advantage of this positioning arrangement can be seen in the fact that a high positioning accuracy is achieved using very simple means.

The high positioning accuracy is achieved in particular in that the catchment range of the pulse-width modulator 40 can be designed such that, on the one hand, a large change in the duty ratio of the pulse-width-modulated control signal 400 is produced even when the magnitudes of the control errors 300 differ little in absolute terms from zero, which corresponds to a high internal gain and thus to the capability to position the pen 10 precisely corresponding to the measurement signal 100 and, on the other hand, limits of the catchment range can be dimensioned such that reaching a limit value results in the maximum speed of motion of the pen 10. In this case, the catchment range of the pulse-width modulator 40 is intended to mean the value range of the control error 300 which can be transferred into a proportional duty ratio. If the control error 300 exceeds the upper limit of the catchment range, the pulse-width-modulated control signal 400 is permanently in the logic state ONE, the pen 10 being moved with the maximum speed of motion in its first movement direction until the control error 300 becomes less than the upper limit of the catchment range. When the control error 300 is less than the lower limit of the catchment range, the pulse-width-modulated control signal 400 is permanently in the logic state ZERO, the pen 10 being moved with the maximum speed of motion in its second movement direction until the control error 300 becomes greater than the lower limit of the catchment range. The catchment range of the pulse-width modulator 40 is illustrated in normalized form in FIG. 2 by the limit values "1" and "−1" on the amplitude scale.

A means 60, which is designed as an optocoupler, for DC isolation of the simplest type is actually advantageously suitable for transmitting continuous-wave signals, such as those which are emitted by the pulse-width modulator 40 when the control error 300 leaves the catchment range. This makes it possible to achieve a high desired positioning accuracy of the pen 10, corresponding to the measurement signal 100, with very simple means.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A recording device for recording the time profile of at least one measurement signal, comprising:
   a) means for transport of a medium to record said at least one measurement signal time profile;
   b) a printing system comprising:
      i) an electric drive motor;
      ii) a transmission apparatus for conversion of the rotational drive movement of said drive motor into a translational movement transversely with respect to the transport direction of said recording medium; and
      iii) means for holding a pen, said pen holding means arranged such that said pen holding means follows the translational movement of said transmission apparatus, said drive motor mechanically coupled through said transmission apparatus, such that said drive motor is electrically isolated, to said means for holding the pen, c) means for controlling said drive motor having a control loop comprising:
        i) means for determining the current position of said pen and providing an electrical pin position signal indicative thereof,
        ii) a summation device for determining a control error signal as the difference between said measurement signal and said electrical pen position signal, and
        iii) a pulse-width modulator responsive to said control error signal for generating a PWM signal,
    d) a signal converter for converting said PWM signal to a signal voltage for driving said drive motor, and
    e) means connected between said pulse-width modulator and said signal converter for DC-decoupling said PWM signal to said signal converter.

2. The recording device of claim 1 wherein said DC-decoupling means is an optocoupler.

3. The recording device of claim 1 wherein said pulse-width modulator comprises a generator for providing a ramp signal and a comparator circuit having first and second(two) inputs, said control error signal being connected to said first input and said ramp signal being connected to said second input.

4. The recording device of claim 1 wherein said signal converter is a microcontroller.

5. The recording device of claim 3 wherein said ramp signal generator is a sawtooth-waveform signal generator.

6. The recording device of claim 3 wherein said ramp signal generator is a triangular-waveform signal generator.

7. The recording device of claim 3 wherein said comparator circuit has an output and said PWM signal has a period, said PWM signal is at said comparator circuit output and said PWM signal period is composed of a pulse duration and a pulse-pause duration.

8. The recording device of claim 7 wherein a difference between said pulse duration and said pulse-pause duration is determined and said difference is a measure of movement speed and of the direction in which said pen is being moved.

9. A recording device for recording the time profile of at least one measurement signal, comprising:

a) means for transport of a medium to record said at least one measurement signal time profile;
    b) a printing system comprising:
        i) an electric drive motor;
        ii) a transmission apparatus for conversion of the rotational drive movement of said drive motor into a translational movement transversely with respect to the transport direction of said recording medium; and
        iii) means for holding a pen, said pen holding means arranged such that said pen holding means follows the translational movement of said transmission apparatus, said drive motor mechanically coupled through said transmission apparatus, such that said drive motor is electrically isolated, to said pen holding means, c) means for controlling said drive motor, having a control loop comprising:
        i) means for determining the current position of said pen and providing an electrical signal indicative thereof,
        iii) a summation device for determining a control error signal as the difference between said measurement signal and said electrical pen position signal, and
        iii) a pulse-width modulator responsive to said control error signal for generating a PWM signal, and
    d) a signal converter DC-decoupled to said pulse-width modulator for converting said PWM signal to a signal voltage for driving said drive motor.

10. The recording device of claim 9 further comprising means for DC-decoupling said PWM signal to said signal converter.

11. The recording device of claim 10 wherein said DC-decoupling means is an optocoupler.

12. The recording device of claim 9 wherein said pulse-width modulator comprises a generator for providing a ramp signal and a comparator circuit having first and second inputs, said control error signal being connected to said first input and said ramp signal being connected to said second input.

13. The recording device of claim 12 wherein said comparator circuit has an output and said PWM signal has a period, said PWM signal at said comparator circuit output and said PWM signal period is composed of a pulse duration and a pulse-pause duration.

14. The recording device of claim 13 wherein a difference is determined between said pulse duration and said pulse-pause duration and said difference is a measure of movement speed and of the direction in which said pen is being moved.

15. The recording device of claim 9 wherein said signal converter is a microcontroller.

16. The recording device of claim 9 wherein said ramp signal generator is a sawtooth-waveform signal generator.

17. The recording device of claim 9 wherein said ramp signal generator is a triangular-waveform signal generator.

* * * * *